(12) United States Patent
Ohtomo et al.

(10) Patent No.: US 10,823,823 B2
(45) Date of Patent: *Nov. 3, 2020

(54) MEASURING INSTRUMENT

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 423 days.

This patent is subject to a terminal disclaimer.

(21) Appl. No.: 15/894,198

(22) Filed: Feb. 12, 2018

(65) Prior Publication Data

US 2018/0231639 A1    Aug. 16, 2018

(30) Foreign Application Priority Data

Feb. 13, 2017    (JP) ................................ 2017-024157

(51) Int. Cl.
*G01S 7/48* (2006.01)
*G01S 7/481* (2006.01)
(Continued)

(52) U.S. Cl.
CPC .......... *G01S 7/4808* (2013.01); *G01C 15/002* (2013.01); *G01S 7/4817* (2013.01);
(Continued)

(58) Field of Classification Search
CPC ...... G01S 7/4808; G01S 17/42; G01S 7/4817; G01S 17/10; G01S 17/66; G01S 7/51; G01C 15/002
(Continued)

(56) References Cited

U.S. PATENT DOCUMENTS

| 8,384,914 B2 * | 2/2013 | Becker | G01C 15/002 |
| | | | 356/141.5 |
| 9,009,000 B2 * | 4/2015 | York | G05B 19/401 |
| | | | 702/154 |

(Continued)

FOREIGN PATENT DOCUMENTS

| JP | 2016-151422 A | 8/2016 | |
| JP | 2016-151423 A | 8/2016 | |
| WO | WO-2004099849 A1 * | 11/2004 | ........... G01S 7/4817 |

*Primary Examiner* — Daniel L Murphy
(74) *Attorney, Agent, or Firm* — Nields, Lemack & Frame, LLC (57) ABSTRACT

A surveying instrument comprises a distance measuring unit which includes a light emitting element, a distance measuring light projecting unit, a light receiving unit and a photodetector for producing a light receiving signal, and which performs a distance measurement of an object to be measured based on the light receiving signal, an optical axis deflecting unit for deflecting the distance measuring optical axis, a projecting direction detecting unit for detecting a deflection angle of the distance measuring optical axis and an arithmetic control component, wherein the optical axis deflecting unit comprises a pair of optical prisms capable of rotating and motors which individually and independently rotate the optical prisms, and wherein the arithmetic control component is configured to control the optical axis deflecting unit, to perform a two-dimensional scanning of the distance measuring light, to perform a distance measurement of when the light receiving signal is detected, to measure a horizontal angle and a vertical angle of the object to be measured, and to obtain three-dimensional coordinates of the object to be measured based on a distance value, and the horizontal angle and the vertical angle.

17 Claims, 9 Drawing Sheets

(51) Int. Cl.
  *G01S 17/42*    (2006.01)
  *G01S 17/10*    (2020.01)
  *G01C 15/00*    (2006.01)
  *G01S 17/66*    (2006.01)
  *G01S 7/51*     (2006.01)

(52) U.S. Cl.
  CPC .............. *G01S 17/10* (2013.01); *G01S 17/42* (2013.01); *G01S 17/66* (2013.01); *G01S 7/51* (2013.01)

(58) Field of Classification Search
  USPC ....................................................... 356/5.01
  See application file for complete search history.

(56) References Cited

U.S. PATENT DOCUMENTS

| | | | |
|---|---|---|---|
| 2007/0257839 A1* | 11/2007 | Srinivasan | G01S 5/02 342/360 |
| 2009/0147239 A1* | 6/2009 | Zhu | G01S 17/87 356/3.12 |
| 2015/0204652 A1* | 7/2015 | Olsson | G01C 3/08 356/72 |
| 2016/0238385 A1 | 8/2016 | Ohtomo et al. | |
| 2016/0238708 A1 | 8/2016 | Ohtomo et al. | |
| 2016/0313553 A1* | 10/2016 | Song | G02B 26/103 |
| 2018/0059221 A1* | 3/2018 | Slobodyanyuk | G01S 17/10 |
| 2018/0329041 A1* | 11/2018 | Ohtomo | G01C 15/002 |
| 2020/0132840 A1* | 4/2020 | Nishita | B66C 13/08 |

* cited by examiner

MEASURING INSTRUMENT

BACKGROUND OF THE INVENTION

The present invention relates to a surveying instrument having a target (or an object to be measured) scanning function.

An already existing total station (TS) performs a measurement after a pole with a reflecting component is installed in a measuring position as an object to be measured and an operator manually sights a reflection mirror and the like. Since the total station performs a one-point sighting, in a case where there are two or more measuring positions, the operator changes a sighting position per each measurement and repeats a measurement. In particular, even in a case where a measurement range is narrow, if a measuring position is changed and a position of the reflecting component is even slightly moved, the operator must perform a sighting again. For this reason, there is a trouble that a total measurement time is lengthened.

SUMMARY OF THE INVENTION

It is an object of the present invention to provide a surveying instrument which can easily sight an object to be measured.

To attain the object as described above, a surveying instrument according to the present invention comprises a distance measuring unit which includes a light emitting element for emitting a distance measuring light, a distance measuring light projecting unit for projecting the distance measuring light, a light receiving unit for receiving a reflected distance measuring light and a photodetector for receiving the reflected distance measuring light and producing a light receiving signal, and which performs a distance measurement of an object to be measured based on the light receiving signal from the photodetector, an optical axis deflecting unit provided on a distance measuring optical axis and for deflecting the distance measuring optical axis, a projecting direction detecting unit for detecting a deflection angle of the distance measuring optical axis and an arithmetic control component for controlling a deflecting action of the optical axis deflecting unit and a distance measuring action of the distance measuring unit, wherein the optical axis deflecting unit comprises a pair of optical prisms capable of rotating with the distance measuring optical axis as a center and motors which individually and independently rotate the optical prisms, and wherein the arithmetic control component is configured to control a deflection by the optical axis deflecting unit by controlling rotating directions, rotating speeds, and a rotation ratio of the pair of optical prisms, to perform a two-dimensional scanning of the distance measuring light, to perform a distance measurement of when the light receiving signal is detected during the two-dimensional scanning, to measure a horizontal angle and a vertical angle of the object to be measured based on a deflection angle detected by the projecting direction detecting unit of when the light receiving signal is detected, and to obtain three-dimensional coordinates of the object to be measured based on a distance value from the distance measuring unit, and the horizontal angle and the vertical angle.

Further, in the surveying instrument according to the present invention, the arithmetic control component is further configured to determine a position of the object to be measured based on a light receiving intensity of the distance measuring unit.

Further, in the surveying instrument according to the present invention, the two-dimensional scanning is a scanning according to a predetermined scanning pattern, and the scanning pattern has an intersection point at which a forward path and a return path intersect, and a distance measurement and a measurement of a horizontal angle and a vertical angle are performed at a time when horizontal angles of two light receiving signals emitted on the forward path and the return path approximately coincide with each other and vertical angles of the two light receiving signals emitted on the forward path and the return path approximately coincide with each other.

Further, in the surveying instrument according to the present invention, the arithmetic control component is configured to move the scanning pattern in at least one of a horizontal direction and a vertical direction and to perform a search of the object to be measured while carrying out a scanning according to the scanning pattern.

Further, in the surveying instrument according to the present invention, a beam shape expanding optical component is provided in the distance measuring light projecting unit, and a luminous flux section of the distance measuring light performing a scanning is expanded.

Further, in the surveying instrument according to the present invention, the beam shape expanding optical component is a cylinder lens, and the luminous flux section of the distance measuring light is expanded only in one direction.

Further, the surveying instrument according to the present invention further comprises an attitude detecting unit capable of detecting a tilt angle and a tilting direction, wherein the arithmetic control component corrects the distance measurement, the horizontal angle, and the vertical angle based on a detection result of the attitude detecting unit.

Further, the surveying instrument according to the present invention further comprises an image pickup unit and a display module which also serves as a touch panel, wherein an image acquired by the image pickup unit is displayed on the display module, and a point as touched on the display module is set as a center of the two-dimensional scanning by the distance measuring light.

Furthermore, the surveying instrument according to the present invention further comprises an image pickup unit, wherein the arithmetic control component is configured to detect the position of the object to be measured in the image acquired by the image pickup unit and to perform the two-dimensional scanning by the distance measuring light with a position as detected as the center.

According to the present invention, the surveying instrument comprises a distance measuring unit which includes a light emitting element for emitting a distance measuring light, a distance measuring light projecting unit for projecting the distance measuring light, a light receiving unit for receiving a reflected distance measuring light and a photodetector for receiving the reflected distance measuring light and producing a light receiving signal, and which performs a distance measurement of an object to be measured based on the light receiving signal from the photodetector, an optical axis deflecting unit provided on a distance measuring optical axis and for deflecting the distance measuring optical axis, a projecting direction detecting unit for detecting a deflection angle of the distance measuring optical axis and an arithmetic control component for controlling a deflecting action of the optical axis deflecting unit and a distance measuring action of the distance measuring unit, wherein the optical axis deflecting unit comprises a pair of optical prisms capable of rotating with the distance measuring optical axis as a center and motors which individually and independently rotate the optical prisms, and wherein the arithmetic control component is configured to control a deflection by the optical axis deflecting unit by controlling rotating directions, rotating speeds, and a rotation ratio of the pair of optical prisms, to perform a two-dimensional scanning of the distance measuring light, to perform a distance measurement of when the light receiving signal is detected during the two-dimensional scanning, to measure a horizontal angle and a vertical angle of the object to be measured based on a deflection angle detected by the projecting direction detecting unit of when the light receiving signal is detected, and to obtain three-dimensional coordinates of the object to be measured based on a distance value from the distance measuring unit, and the horizontal angle and the vertical angle. As a result, the surveying instrument can easily sight the object to be measured, a sighting work by the operator can be omitted, and an efficiency of a measurement work can be improved.

DETAILED DESCRIPTION OF THE PREFERRED EMBODIMENT

A description will be given on embodiments of the present invention by referring to the attached drawings.

First, a description will be given on a surveying instrument having a target (or an object to be measured) scanning function, in which the present invention is carried out, by referring to FIG. 1 to FIG. 3. It is to be noted that, in a description as given below, a total station is used as a surveying instrument.

Figure 1:
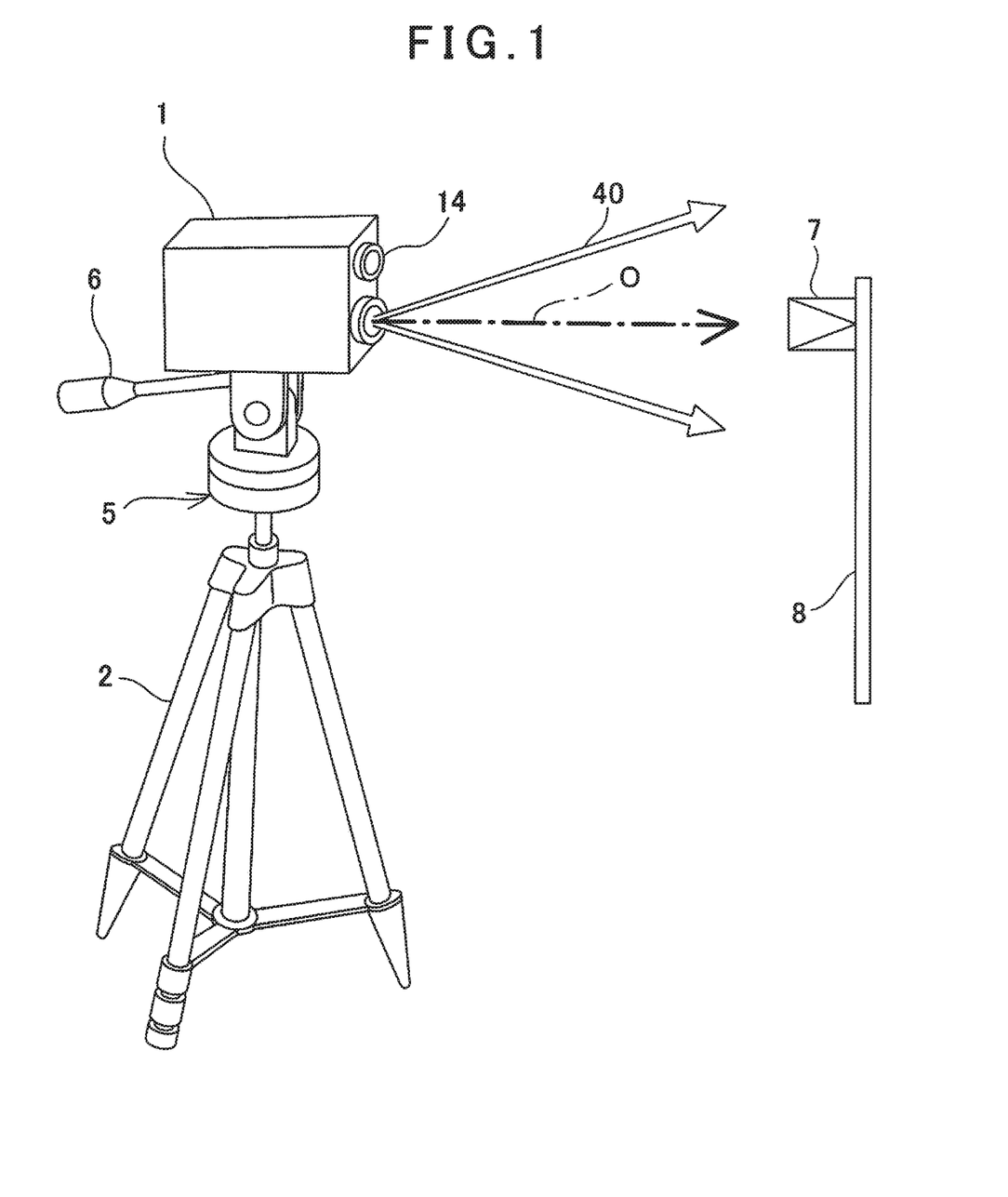
FIG. 1 is a schematical external view of a total station having a target scanning function.

FIG. 1 shows a state where a total station 1 according to the present embodiment is installed via a tripod 2 as a supporting device. In the drawing, reference sign O denotes an optical axis of the total station 1 and further shows a state where the optical axis is not deflected (a reference optical axis). Further, in FIG. 1, reference numeral 7 denotes a prism as a target or an object to be measured, and the prism 7 is provided in a designated position (for instance, a known position from a lower end) of a pole 8.

The total station 1 is attached on the tripod 2 via a rotation base 5. The rotation base 5 has a lever 6, and by operating the lever 6, the rotation base 5 can rotate the total station 1 in an up and down direction (a vertical direction) or in a lateral direction (a horizontal direction) and fix the total station 1 in an attitude as required.

A description will be given on the total station 1 by referring to FIG. 2 and FIG. 3.

The total station 1 includes a distance measuring light projecting unit 11, a light receiving unit 12, a distance measurement calculating component 13, an image pickup unit 14, a projecting direction detecting unit 15, a motor driver 16, an attitude detecting unit 17, a communication component 18, an arithmetic control component 19, a storage component 20, an image pickup control component 21, an image processing component 22, and a display module 25, and these units and components are accommodated in a case 9 and integrated. It is to be noted that the distance measuring light projecting unit 11, the light receiving unit 12, the distance measurement calculating component 13, or the like constitute a distance measuring unit.

The distance measuring light projecting unit 11 has a projection optical axis 26, and a light emitting element 27, e.g. a laser diode (LD), is provided on the projection optical axis 26. Further, a projecting lens 28 is provided on the projection optical axis 26. Further, the projection optical axis 26 is deflected by a first reflection mirror 29 as a deflecting optical component disposed on the projection optical axis 26 and a second reflection mirror 32 as a deflecting optical component disposed on a light receiving optical axis 31 (to be described later) so as to coincide with the light receiving optical axis 31. The first reflection mirror 29 and the second reflection mirror 32 constitute a projection optical axis deflecting unit.

The light emitting element 27 emits a pulsed laser beam, and the distance measuring light projecting unit 11 projects the pulsed laser beam emitted from the light emitting element 27 as a distance measuring light 23. It is to be noted that, as a distance measuring light, a continuous light or an intermitted modulation light disclosed in Japanese Patent Laid-open Publication No. 2016-161411 may be used as well as a pulsed laser light.

A description will be given on the light receiving unit 12. A reflected distance measuring light 24 from an object to be measured (i.e., a measuring point) enters the light receiving unit 12. The light receiving unit 12 has the light receiving optical axis 31, and the projection optical axis 26 deflected by the first reflection mirror 29 and the second reflection mirror 32 coincides with the light receiving optical axis 31 as described above. It is to be noted that a state where the projection optical axis 26 coincides with the light receiving optical axis 31 is determined as a distance measuring optical axis 40 (see FIG. 1).

An optical axis deflecting unit 35 (to be described later) is disposed on the projection optical axis 26 as deflected, i.e., on the light receiving optical axis 31. A straight optical axis passing through a center of the optical axis deflecting unit 35 is the reference optical axis O. The reference optical axis O coincides with the projection optical axis 26 or the light receiving optical axis 31 which is not deflected by the optical axis deflecting unit 35.

An image forming lens 34 is disposed on the light receiving optical axis 31 which passes through the optical axis deflecting unit 35 and enters, and a photodetector 33, for instance, a photodiode (PD) is also provided. The image forming lens 34 focuses the reflected distance measuring light 24 on the photodetector 33. The photodetector 33 receives the reflected distance measuring light 24 and produces a light receiving signal. The light receiving signal is input to the distance measurement calculating component 13. The distance measurement calculating component 13 determines a distance to the measuring point based on the light receiving signal.

A description will be given on the optical axis deflecting unit 35 by referring to FIG. 3.

The optical axis deflecting unit 35 is constituted of a pair of optical prisms 36a and 36b. The optical prisms 36a and 36b are designed in a disk-like shape respectively, disposed on the light receiving optical axis 31 so as to be orthogonal to the light receiving optical axis 31, overlapped on each other and arranged in parallel to each other. As for the optical prisms 36a and 36b, a Fresnel prism is preferably used in order to reduce a thickness of a prism and to reduce a size of the instrument.

A central part of the optical axis deflecting unit 35 is designed as a distance measuring light deflecting unit 35a which is a first optical axis deflecting unit which the distance measuring light 23 passes through and is projected. A portion except the central part of the optical axis deflecting unit 35 is designed as a reflected distance measuring light deflecting unit 35b which is a second optical axis deflecting unit which the reflected distance measuring light 24 passes through and enters.

The Fresnel prisms used as the optical prisms 36a and 36b are constituted of prism elements 37a and 37b composed of each single prism and a large number of prism elements 38a and 38b, which are formed in parallel to each other respectively, and have a disk-like shape. The optical prisms 36a and 36b, each of the prism elements 37a and 37b and the prism elements 38a and 38b have the same optical characteristics, respectively.

The prism elements 37a and 37b are large enough to allow the distance measuring light 23 to pass through. By being composed of a single prism, the prism elements 37a and 37b can obtain optical characteristics with high accuracy. The prism elements 37a and 37b constitute the distance measuring light deflecting unit 35a.

The Fresnel prisms are composed of a large number of prism elements 38a and 38b, and the prism elements 38a and 38b act as the reflected distance measuring light deflecting unit 35b. Further, since a distance from the optical axis deflecting unit 35 to the photodetector 33 is short, the prism elements 38a and 38b are not required to have optical characteristics with high accuracy.

The Fresnel prism may be manufactured from an optical glass or may be molded by using an optical plastic material. By molding the Fresnel prism by using the optical plastic material, a more inexpensive Fresnel prism can be manufactured. It is to be noted that only the prism elements 37a and 37b, which are required to have a high accuracy, may be manufactured from the optical glass.

The optical prisms 36a and 36b are arranged in such a manner that the optical prisms 36a and 36b can independently and individually rotate with the light receiving optical axis 31 as a center. By independently controlling rotating directions, rotation amounts and rotating speeds, the optical prisms 36a and 36b deflect the projection optical axis 26 of the distance measuring light 23 as emitted in an arbitrary direction, and deflect the light receiving optical axis 31 of the reflected distance measuring light 24 as received in parallel to the projection optical axis 26.

An outer shape of each of the optical prisms 36a and 36b is designed in a circle shape with the light receiving optical axis 31 as the center. Taking an expansion of the reflected distance measuring light 24 into consideration, diameters of the optical prisms 36a and 36b are set so that a sufficient light amount can be obtained.

A ring gear 39a is fitted with an outer periphery of the optical prism 36a, and a ring gear 39b is fitted with an outer periphery of the optical prism 36b.

A driving gear 41a meshes with the ring gear 39a, and the driving gear 41a is fixed to an output shaft of a motor 42a. Similarly, a driving gear 41b meshes with the ring gear 39b, and the driving gear 41b is fixed to an output shaft of a motor 42b. The motors 42a and 42b are electrically connected to the motor driver 16.

As the motors 42a and 42b, a motor which can detect a rotation angle or a motor which rotates corresponding to a driving input value, e.g., a pulse motor is used. Alternatively, by using a rotation angle detector which detects a rotation amount (the rotation angle) of the motor, e.g., an encoder or the like, the rotation amount of the motor may be detected. The rotation amounts of the motors 42a and 42b are detected respectively, and the motors 42a and 42b are individually controlled by the motor driver 16. It is to be noted that encoders may be directly attached to the ring gears 39a and 39b respectively so that the rotation angles of the ring gears 39a and 39b are directly detected by the encoders.

The driving gears 41a and 41b and the motors 42a and 42b are provided at positions not interfering with the distance measuring light projecting unit 11, for instance, on a lower side of the ring gears 39a and 39b.

The projecting lens 28, the first reflection mirror 29, the second reflection mirror 32, the distance measuring light deflecting unit 35a or the like make up a light projecting optical system, and the reflected distance measuring light deflecting unit 35b, the image forming lens 34 or the like make up a light receiving optical system.

The distance measurement calculating component 13 controls the light emitting element 27, and makes the light emitting element 27 emit a pulsed laser beam as the distance measuring light 23. The projection optical axis 26 is deflected by the prism elements 37a and 37b (the distance measuring light deflecting unit 35a) so that the distance measuring light 23 is directed toward a measuring point. In a state where the distance measuring optical axis 40 sights the object to be measured (the prism 7), the distance measurement is performed.

The reflected distance measuring light 24 as reflected from the object to be measured 7 enters through the prism elements 38a and 38b (the reflected distance measuring light deflecting unit 35b) and the image forming lens 34, and is received by the photodetector 33. The photodetector 33 sends a light receiving signal to the distance measurement calculating component 13, the distance measurement calculating component 13 performs the distance measurement at the measuring point (a point irradiated with the distance measuring light) per each pulsed light based on the light receiving signal from the photodetector 33, and distance measurement data is stored in the storage component 20.

The projecting direction detecting unit 15 counts driving pulses input to the motors 42a and 42b and detects rotation angles of the motors 42a and 42b. Alternatively, the projecting direction detecting unit 15 detects the rotation angles of the motors 42a and 42b based on signals from the encoders. Further, the projecting direction detecting unit 15 calculates rotational positions of the optical prisms 36a and 36b based on the rotation angles of the motors 42a and 42b.

Further, the projecting direction detecting unit 15 calculates a deflection angle and a projecting direction of the distance measuring light per each pulsed light based on refractive indexes and the rotational positions of the optical prisms 36a and 36b, and calculation results are input to the arithmetic control component 19 by being associated with a distance measurement result.

When the arithmetic control component 19 controls rotational directions and rotating speeds of the motors 42a and 42b and a rotation ratio between the motors 42a and 42b, the arithmetic control component 19 controls a deflecting action by the optical axis deflecting unit 35. Further, the arithmetic control component 19 calculates a horizontal angle and a vertical angle of the measuring point based on the deflection angle and the projecting direction of the distance measuring light 23 and associates the horizontal angle and the vertical angle with the distance measurement data with respect to the measuring point. Thereby, three-dimensional data of the object to be measured can be acquired.

A description will be given on the attitude detecting unit 17. It is to be noted that, as the attitude detecting unit 17, an attitude detecting unit disclosed in Japanese Patent Laid-open Publication No. 2016-151423 can be used.

A brief description will be given on the attitude detecting unit 17.

The attitude detecting unit 17 has a frame 45, and the frame 45 is fixed to the case 9 or fixed to a structural member and integrated with the total station 1.

A sensor block 46 is attached on the frame 45 via a gimbal. The sensor block 46 can freely rotate 360° in two directions around two axes which are orthogonal to each other.

A first tilt sensor 47 and a second tilt sensor 48 are attached on the sensor block 46.

The first tilt sensor 47 is for detecting the horizontal with high accuracy, for instance, a tilt detector which allows a detection light to enter a horizontal liquid surface and detects the horizontal based on a change in a reflection angle of a reflection light or a bubble tube which detects a tilt based on a positional change of a sealed air bubble. Further, the second tilt sensor 48 is for detecting a change in a tilt with high responsiveness and is, e.g., an acceleration sensor.

Relative rotation angles of the two axes of the sensor block 46 with respect to the frame 45 are detected by encoders 49 and 50.

Further, a motor (not shown) which rotates the sensor block 46 and maintains the sensor block 46 horizontally is provided with respect to each of the two axes, and the motors are controlled by the arithmetic control component 19 so as to maintain the sensor block 46 horizontally based on detection results from the first tilt sensor 47 and the second tilt sensor 48.

In a case where the sensor block 46 tilts (in a case where the total station 1 tilts), the relative rotation angles of the frame 45 with respect to the sensor block 46 (the horizontal) are detected by the encoders 49 and 50, and a tilt angle and a tilting direction of the total station 1 are detected based on detection results of the encoders 49 and 50.

Since the sensor block 46 can freely rotate 360° around the two axes, the attitude detecting unit 17 enables to perform an attitude detection in all directions no matter what attitude the attitude detecting unit 17 takes (for instance, even when the attitude detecting unit 17 is upside down).

In the attitude detection, in a case where a high responsiveness is required, although the attitude detection and an attitude control are performed based on the detection result of the second tilt sensor 48, the second tilt sensor 48 has poorer detection accuracy than the first tilt sensor 47 in general.

In the attitude detecting unit 17, by comprising the first tilt sensor 47 with high accuracy and the second tilt sensor 48 with high responsiveness, the attitude detecting unit 17 performs the attitude control based on the detection result of the second tilt sensor 48 and can perform the attitude detection with high accuracy by the first tilt sensor 47.

The detection result of the second tilt sensor 48 can be calibrated based on a detection result of the first tilt sensor 47. That is, if a deviation occurs between values of the encoders 49 and 50 of when the first tilt sensor 47 detects the horizontal, that is, between an actual tilt angle and the tilt angle detected by the second tilt sensor 48, the tilt angle of the second tilt sensor 48 can be calibrated based on the deviation.

Therefore, by obtaining a relationship between the detected tilt angle of the second tilt sensor 48 and the tilt angle which is obtained based on a horizontal detection by the first tilt sensor 47 and the detection results of the encoders 49 and 50 in advance, the tilt angle detected by the second Lilt sensor 48 can be calibrated. Therefore, an accuracy of the attitude detection with high responsiveness by the second tilt sensor 48 can be improved.

When a fluctuation in a tilt is large and/or when a change in a tilt is rapid, the arithmetic control component 19 controls the motors based on a signal from the second tilt sensor 48. Further, when a fluctuation in the tilt is small and/or when a change in the tilt is slow, that is, in a state where the first tilt sensor 47 is capable of following up, the arithmetic control component 19 controls the motors based on a signal from the first tilt sensor 47.

It is to be noted that the storage component 20 stores a comparison data which shows a comparison result between the detection result of the first tilt sensor 47 and the detection result of the second tilt sensor 48. The arithmetic control component 19 calibrates the detection result by the second tilt sensor 48 based on the signal from the second tilt sensor 48. This calibration enables to improve the detection result by the second tilt sensor 48 to a detection accuracy of the first tilt sensor 47. Thus, in the attitude detection by the attitude detecting unit 17, the high responsiveness can be realized while maintaining the high accuracy.

The image pickup unit 14 is a camera which has an image pickup optical axis 43 parallel to the reference optical axis O of the total station 1 and has a field angle larger than a maximum deflection angle (for instance, ±20°) by the optical prisms 36a and 36b, e.g., 50°, and acquires image data including a scanning range of the total station 1. A relationship between the image pickup optical axis 43 and the projection optical axis 26 and a relationship between the image pickup optical axis 43 and the reference optical axis O are known. Further, the image pickup unit 14 can acquire video images or continuous images.

The image pickup control component 21 controls an image pickup of the image pickup unit 14. In a case where the image pickup unit 14 picks up the video images or the continuous images, the image pickup control component 21 synchronizes a timing of acquiring a frame image constituting the video images or the continuous images with a timing of performing a scanning by the total station 1. The arithmetic control component 19 also carries out associating the images and measurement data.

An image pickup element 44 of the image pickup unit 14 is a CCD or a CMOS sensor which is an aggregate of pixels, and it is so arranged that a position of each pixel on an image element can be specified. For instance, each pixel has pixel coordinates in a coordinate system with the image pickup optical axis 43 as an origin point, and the position of each pixel on the image element can be specified by the pixel coordinates.

The image processing component 22 performs image processings such as an edge extraction processing, a feature point extraction, an image tracking processing, and an image matching, and the like to the image data acquired by the image pickup unit 14, and prepares a gray-scale image from the image data.

The display module 25 displays the images acquired by the image pickup unit 14 and displays a measurement condition, the measurement data, and the like. It is to be noted that the display module 25 is designed as a touch panel and also functions as an operation module.

A description will be given on a deflecting action and a scanning action of the optical axis deflecting unit 35 by referring to FIG. 4A, FIG. 4B, and FIG. 4C.

Figure 4A:
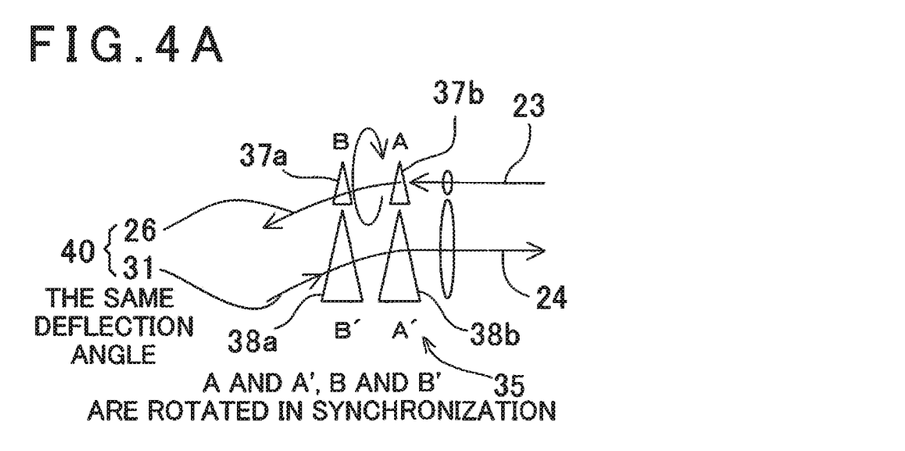
FIG. 4A, FIG. 4B, and FIG. 4C are drawings to explain arm action of the optical axis deflecting unit.

It is to be noted that, in order to simplify an explanation, in FIG. 4A, the optical prisms 36a and 36b are shown by separating the prism elements 37a and 37b and the prism elements 38a and 38b. Further, FIG. 4A shows a state where the prism elements 37a and 37b and the prism elements 38a and 38b are positioned in the same direction, and, in this state, the maximum deflection angle (for instance, ±20°) can be obtained. Further, a minimum deflection angle obtained at a position where either one of the optical prisms 36a and 36b rotates 180°, mutual optical actions of the optical prisms 36a and 36b are offset, and the deflection angle becomes 0°. Therefore, an optical axis of a pulsed laser beam (the distance measuring optical axis 40) as projected and received through the optical prisms 36a and 36b coincides with the reference optical axis O.

The distance measuring light 23 is emitted from the light emitting element 27, and the distance measuring light 23 is turned to a parallel luminous flux by the projecting lens 28, passes through the distance measuring light deflecting unit 35a (the prism elements 37a and 37b), and is projected toward the object to be measured 7. Here, as a result of passing through the distance measuring light deflecting unit 35a, the distance measuring light 23 is deflected in a direction as required by the prism elements 37a and 37b and is projected (FIG. 4A).

The reflected distance measuring light 24 as reflected by the object to be measured 7 is entered through the reflected distance measuring light deflecting unit 35b, and is focused on the photodetector 33 by the image forming lens 34.

When the reflected distance measuring light 24 passes through the reflected distance measuring light deflecting unit 35b, an optical axis of the reflected distance measuring light 24 is deflected by the prism elements 38a and 38b so as to coincide with the light receiving optical axis 31 (FIG. 4A).

By combining the rotational position of the optical prism 36a with the rotational position of the optical prism 36b, a deflecting direction and a deflection angle of the distance measuring light to be projected can be arbitrarily changed.

Further, in a state where a positional relationship between the optical prism 36a and the optical prism 36b is fixed (in a state where a deflection angle obtained by the optical prism 36a and the optical prism 36b is fixed), the optical prism 36a and the optical prism 36b are integrally rotated by the motors 42a and 42b. A locus drawn by the distance measuring light passing through the distance measuring light deflecting unit 35a becomes a circle with the distance measuring optical axis 40 as the center.

Therefore, when the optical axis deflecting unit 35 is rotated while emitting the laser beam from the light emitting element 27, the distance measuring light 23 can be scanned by a circular locus. It is to be noted that it is needless to say that the reflected distance measuring light deflecting unit 35b rotates integrally with the distance measuring light deflecting unit 35a.

Figure 4B:
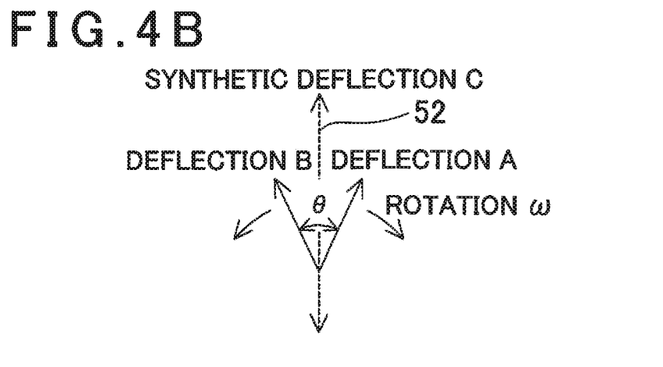

Next, FIG. 4B shows a case where the optical prism 36a and the optical prism 36b are relatively rotated. Assuming that a deflecting direction of an optical axis as deflected by the optical prism 36a is a deflection "A" and a deflecting direction of an optical axis as deflected by the optical prism 36b is a deflection "B", the deflection of the optical axes by the optical prisms 36a and 36b becomes a synthetic deflection "C" as an angle difference θ between the optical prisms 36a and 36b.

Therefore, in a case where the optical prism 36a and the optical prism 36b are synchronized in an opposite direction and reciprocally rotated at a constant speed, the distance measuring light passed through the optical prisms 36a and 36b is scanned linearly. Therefore, when the optical prism 36a and the optical prism 36b are reciprocally rotated in the opposite direction at the constant speed, as shown in FIG. 4B, the distance measuring light can be reciprocally scanned in a direction of the synthetic deflection C by a linear locus 52.

Figure 4C:
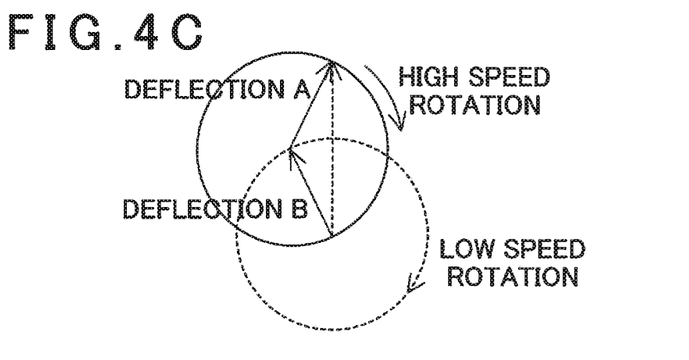

Further, as shown in FIG. 4C, when the optical prism 36b is rotated at a rotating speed lower than a rotating speed of the optical prism 36a, since the distance measuring light is rotated while the angle difference θ gradually increases, a scanning locus of the distance measuring light becomes a spiral form.

Further, by individually controlling the rotating directions and the rotating speeds of the optical prism 36a and the optical prism 36b, various scanning patterns, e.g., a pattern where the scanning locus of the distance measuring light is made in an irradiation direction (scanning in a radial direction) with the reference optical axis O as the center, or in the horizontal direction, or in the vertical direction, or the like can be obtained.

Furthermore, by combining a scanning in a horizontal direction and a scanning in a vertical direction, a two-dimensional scanning is made to be possible. Further, a two-dimensional scanning pattern with a center is made to be possible, and in this case, a center of the scanning pattern is made to coincide with the measuring point.

Figure 5:
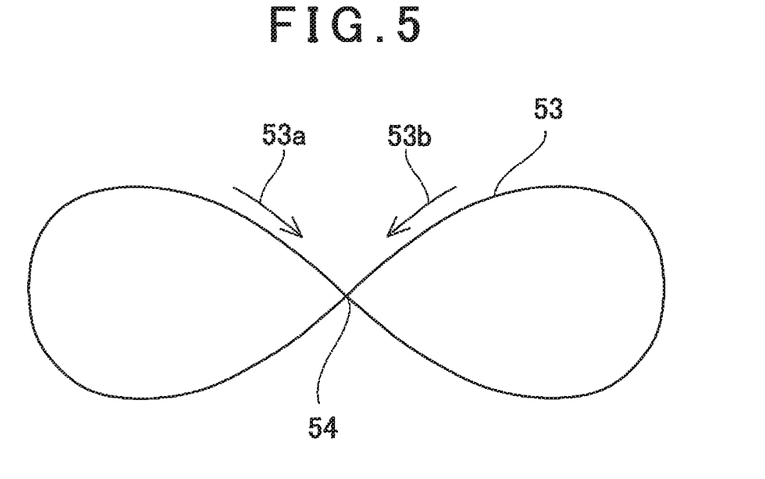
FIG. 5 is a drawing to show one example of a scanning pattern acquired by the optical axis deflecting unit.

FIG. 5 shows one example of a two-dimensional scanning pattern 53 which can be used for performing an alignment between the object to be measured 7 (the prism 7) and the distance measuring optical axis 40.

By combining the rotating directions and the rotating speeds of the optical prism 36a and the optical prism 36b and a rotation ratio between the optical prism 36a and the optical prism 36b, the scanning pattern 53 in which a scanning forward path and a scanning return path intersect at the center (an intersection point 54) of the scanning pattern can be formed. For instance, a scanning can be performed in a shape of an infinity sign (∞).

Figure 6:
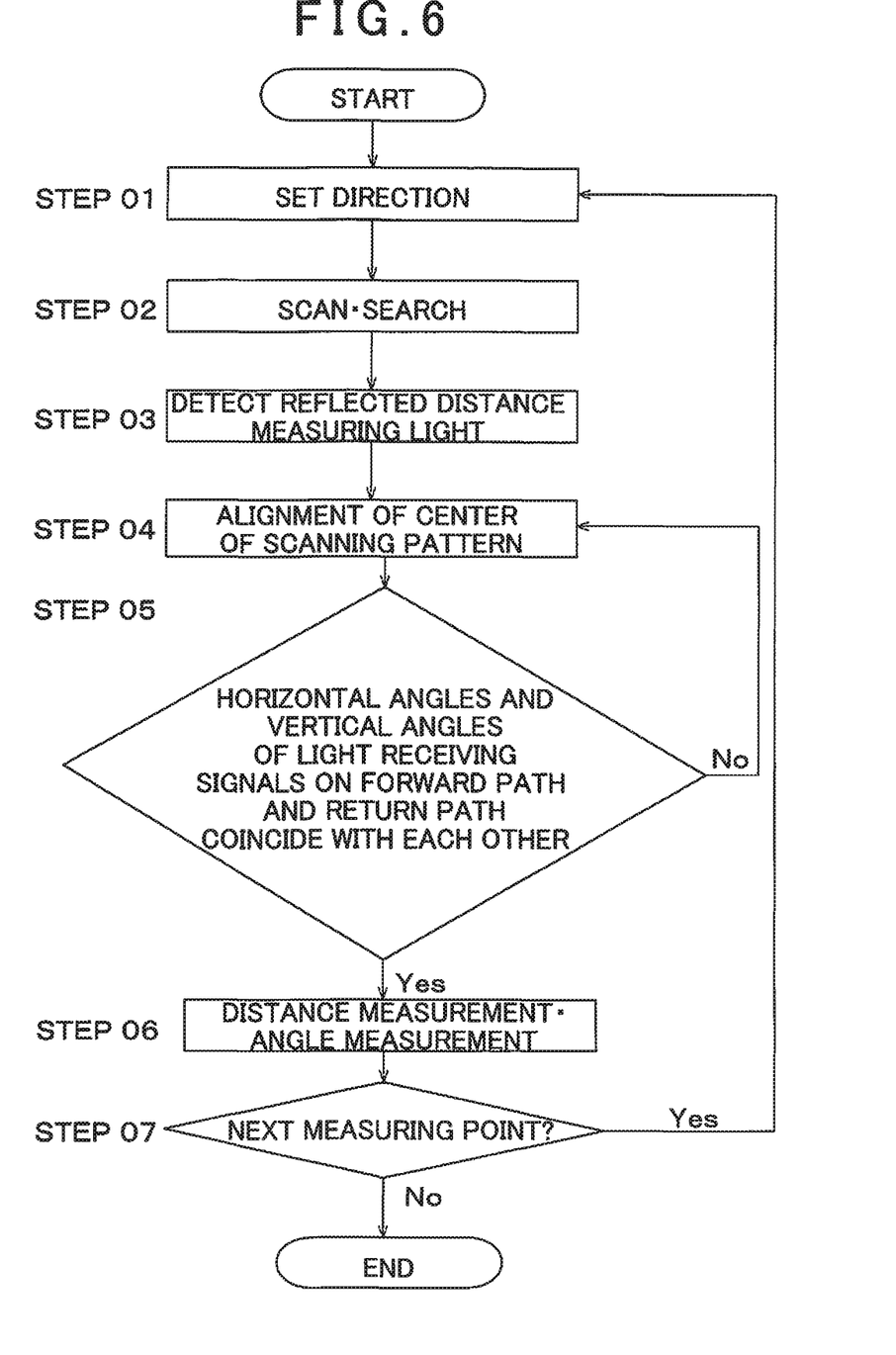
FIG. 6 is a flowchart to show an action of the present embodiment.

By referring to FIG. 6, a description will be given on a measuring operation of the total station 1.

The tripod 2 is installed at a known point or a predetermined point. A tilt of the total station 1 with respect to the horizontal (that is, the vertical of the total station 1), that is, a tilt angle and a tilting direction of the reference optical axis O with respect to the horizontal angle are detected by the attitude detecting unit 17. Therefore, since the tilt angle and the tilting direction can be made to become known, there is no need to level the total station 1 itself so as to be in a horizontal position. Therefore, after the total station 1 is installed at a known position, the total station 1 can immediately carry out a measurement work.

Step 01 In order to make the distance measuring optical axis 40 coincide with a center of the object to be measured 7, the total station 1 is approximately directed toward the object to be measured 7.

At this time, it may be so arranged that the image acquired by the image pickup unit 14 is displayed on the display module 25, and the operator visually sets a direction of the total station 1 so that the object to be measured 7 is located at an image center in the image. Alternatively, in a case where the object to be measured 7 is displayed in the image, the operator may touch the object to be measured 7 on the display module 25 and set a direction of the object to be measured. Further, it may be so arranged that a position where the operator touched is set at a center of a scanning, and a scanning is started with the position where the operator touched as the center by touching the object to be measured 7 on the display module 25.

Step 02 The arithmetic control component 19 controls drivings of the motors 42*a* and 42*b* and the arithmetic control component 19 makes the distance measuring light 23 scan with a direction of the object to be measured 7 as set as the center according to the scanning pattern 53 by a cooperation of a rotation of the optical prism 36*a* and a rotation of the optical prism 36*b*. Further, since a scanning operation is an operation in which the optical prisms 36*a* and 36*b* are simply rotated, the optical prisms 36*a* and 36*b* can be rotated at a high speed, and a high-speed scanning can be performed.

Further, the arithmetic control component 19 moves the scanning pattern 53 while scanning the distance measuring light 23 according to the scanning pattern 53. For instance, by moving the scanning pattern 53 in an up and down direction within a range of a predetermined angle (for instance, ±2°), the object to be measured 7 can be searched in the up and down direction in a horizontal width (for instance, a horizontal angle of ±1°) which the scanning pattern 53 has. Hereinafter, a scanning range which is obtained by a movement of the scanning pattern 53 is referred to as a searching range. It is to be noted that it is needless to say that a horizontal width, a vertical height, and the like of the scanning pattern 53 itself can be arbitrarily selected.

Here, assuming that a center of a search and a searching range by the distance measuring light 23 are included in a range of the maximum deflection angle (for instance, ±20°) with the reference optical axis O as a reference, a movement of the scanning pattern 53 in the up and down direction can be performed by a cooperation of rotations of the optical prism 36*a* and the optical prism 36*b* and the total station 1 itself may be kept in a fixed state.

Step 03 If the reflected distance measuring light 24 from the object to be measured 7 is detected on a scanning locus (if the object to be measured 7 is detected) in a process of the search, a horizontal angle and a vertical angle of the distance measuring light 23 in the projecting direction of when a light is received are detected by the projecting direction detecting unit 15. It is to be noted that, although a reflected distance measuring light from an object other than the object to be measured 7 also enters in the process of the search, a reflected distance measuring light from the object to be measured 7 is a reflection light which has the higher intensity, the closer to the center Therefore, by monitoring a light receiving intensity by the arithmetic control component 19, the arithmetic control component 19 can detect the center of the object to be measured with higher accuracy.

It is to be noted that, in a case where the object to be measured 7 cannot be detected even when moving the scanning pattern 53 in the up and down direction, in order to expand the searching range, the scanning pattern 53 may be moved in a horizontal direction, and the scanning pattern 53 may be further moved in the up and down direction.

Step 04 The arithmetic control component 19 controls the rotations of the optical prism 36*a* and the optical prism 36*b* so that the reflected distance measuring light 24 is received at the intersection point 54 of the scanning pattern 53 and moves the scanning pattern 53 (an alignment of the center of the scanning pattern 53).

Step 05 When a direction of the intersection point 54 approximately coincides with the direction of the object to be measured 7, the reflected distance measuring light 24 from the object to be measured 7 is received on each of a forward path 53*a* and a return path 53*b* of one cycle of the scanning pattern 53, and light receiving signals on the forward path and the return path are detected by the photodetector 33.

A horizontal angle and a vertical angle of the light receiving signals on the forward path 53*a* and the return path 53*b* are detected, and the scanning pattern 53 is moved so that the horizontal angles of both the light receiving signals approximately coincide with each other and the vertical angles of both the light receiving signals approximately coincide with each other.

A point at which the horizontal angles of both the light receiving signals approximately coincide with each other and the vertical angles of both the light receiving signals approximately coincide with each other is a state in which the intersection point 54 of the scanning pattern 53 coincides with the object to be measured 7 and a state in which the distance measuring optical axis 40 coincides with the center of the object to be measured 7.

Step 06 After the distance measuring light 23 becomes a state in which the distance measuring light 23 accurately sights the object to be measured 7, a distance measurement of the object to be measured 7 is carried out. Further, a horizontal angle and a vertical angle of the object to be measured 7 at this time are a horizontal angle and a vertical angle of when the horizontal angles and the vertical angles of both the light receiving signals approximately coincide with each other, and are measured as a horizontal angle and a vertical angle of the measuring point. It is to be noted that an installation attitude of the total station 1 is detected by the attitude detecting unit 17, and if the installation attitude of the total station 1 is not horizontal, the horizontal angle, the vertical angle and the distance measurement result as measured are corrected based on a tilt angle and a tilting direction which are detected by the attitude detecting unit 17. Thus, three-dimensional coordinates of the center of the object to be measured 7 can be measured.

Further, the arithmetic control component 19 controls the distance measurement calculating component 13 so as to obtain a measurement result of when the horizontal angles of both the light receiving signals approximately coincide with each other and the vertical angles of both the light receiving signals approximately coincide with each other, or the arithmetic control component 19 controls the distance measurement calculating component 13 so as to carry out a distance measurement synchronizing with the time when the horizontal angles of both the light receiving signals approximately coincide with each other and the vertical angles of both the light receiving signals approximately coincide with each other. Thereby, the total station 1 can automatically perform a sighting and a measurement of the object to be measured 7.

Thus, the object to be measured 7 can be accurately sighted and the distance measurement of the object to be measured 7 and the measurement of the horizontal angle and the vertical angle of the object to be measured 7 can be accurately performed without using a telescope or the like and an operation by the operator.

Step 07 In a case where the measurement is continuously performed, the object to be measured 7 is moved to a next measuring point and the measurement is performed.

Figure 7:
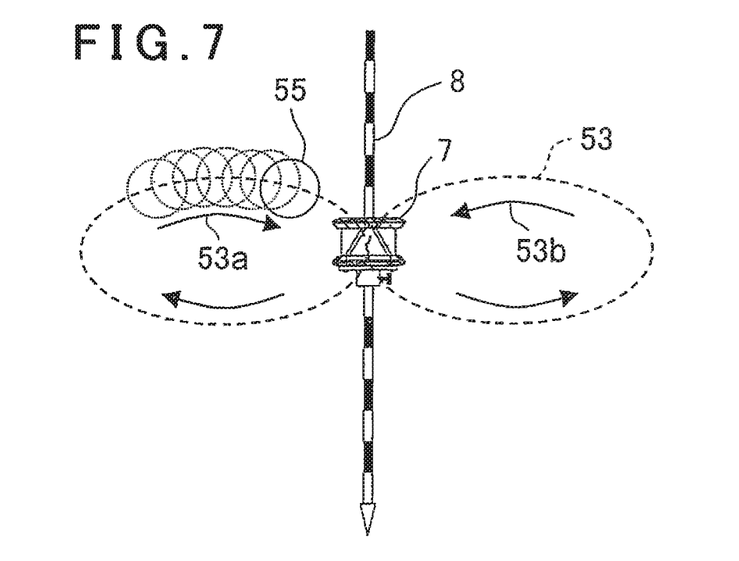
FIG. 7 is an explanatory drawing to show a relationship between the scanning pattern and an object to be measured.
Figure 8:
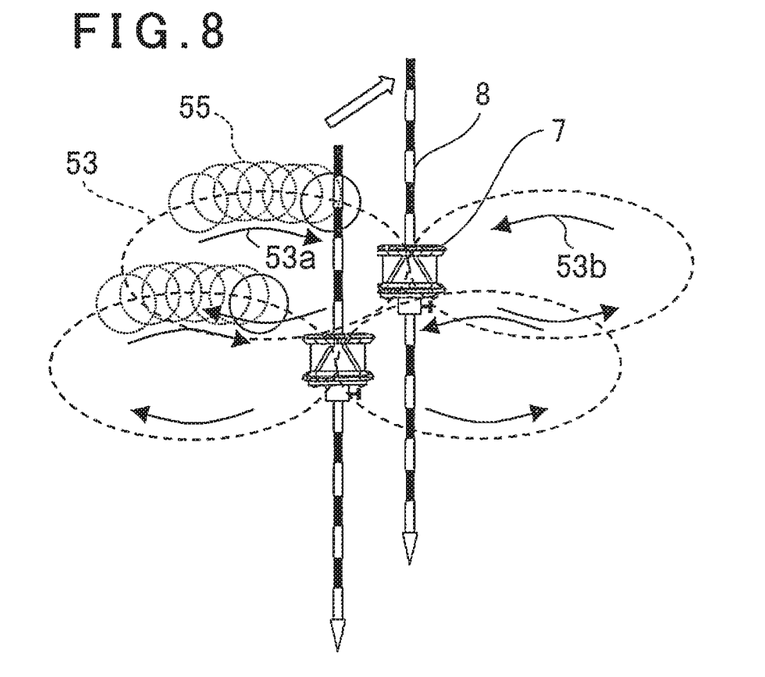
FIG. 8 is an explanatory drawing to show a relationship between the scanning pattern and the object to be measured in a case where the object to be measured is moved.

FIG. 7 shows a state where the distance measuring optical axis 40 coincides with the center of the object to be measured 7, and FIG. 8 shows a case where the object to be measured 7 is moved. In FIG. 7 and FIG. 8, reference numeral 55 denotes a cross-sectional shape of a beam, and a state where a beam diameter is enlarged in the drawings. It is to be noted that an enlargement of a beam 55 will be described later.

If a moving amount of the object to be measured 7 is small or a moving speed of the object to be measured 7 is low, by carrying out a scanning according to the scanning pattern 53, the object to be measured 7 after moving or while moving can be immediately detected. Therefore, a sighting can be carried out without re-setting a measurement of the measuring point after moving. Further, a tracking of the object to be measured 7 can become possible while moving.

In a case where the object to be measured 7 is moved and the moving amount exceeds a range of the scanning pattern 53 of the distance measuring light 23 and the object to be measured 7 cannot be detected by the scanning according to the scanning pattern 53, a search with a movement of the scanning pattern 53 is carried out again.

Further, if a position of the object to be measured 7 after moving is within a maximum searching range (the maximum deflection angle is ±20° with respect to the reference optical axis O), the object to be measured 7 is detected again, and a center alignment action (a sighting action) of the scanning pattern 53 is performed.

It is to be noted that, if a position of the object to be measured 7 after moving is designated on the image, a scanning center of the scanning pattern 53 can be set at a designated point, a searching range is limited, and a time for searching is shortened.

In a case where the object to be measured 7 is moved beyond the maximum searching range, a direction of the search needs to be set again, and a direction of the total station 1 is changed so that the object to be measured 7 is captured in the image.

Further, by capturing the object to be measured 7 within the maximum searching range, Step 01 to Step 06 are carried out.

Figure 9:
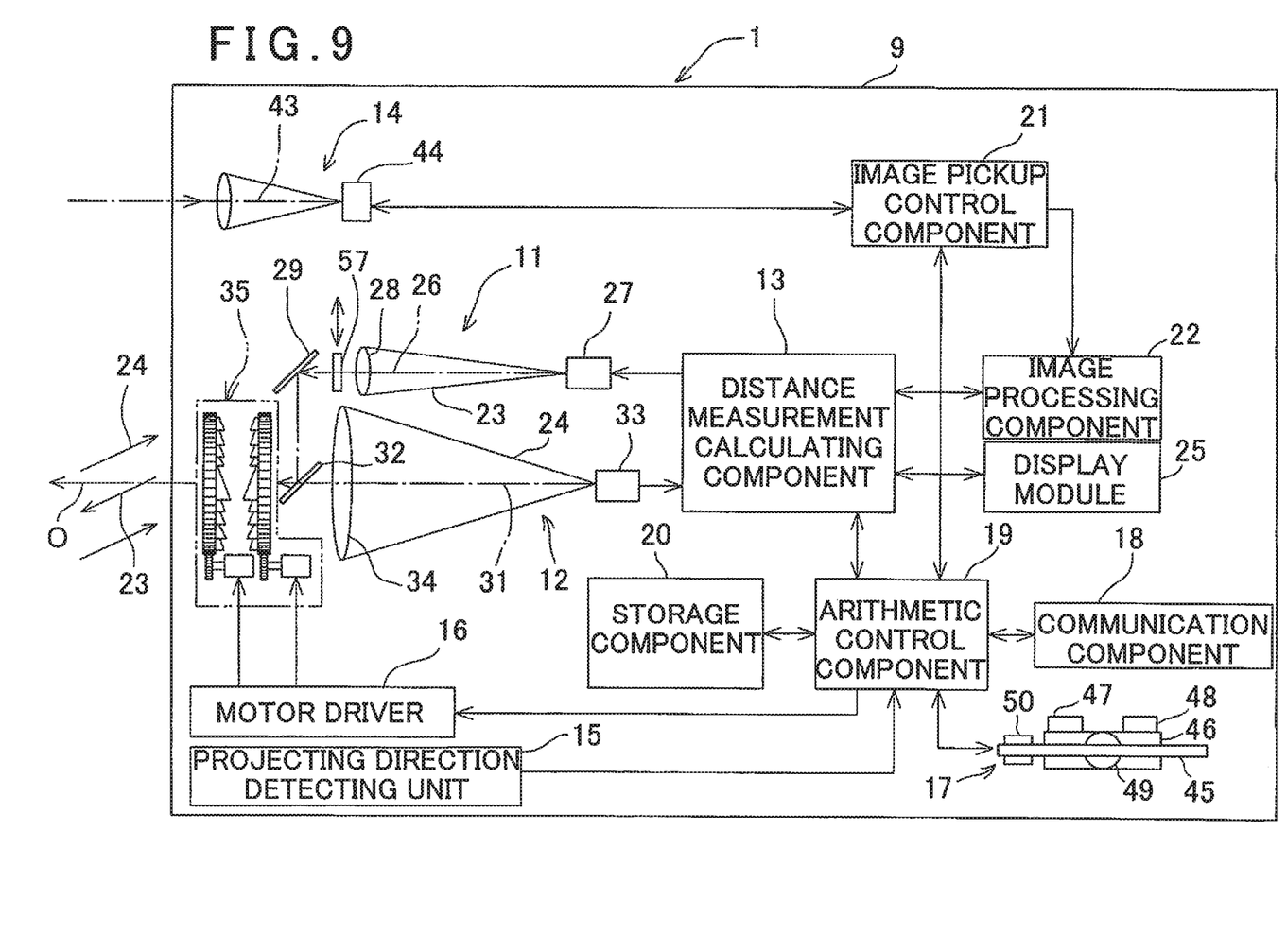
FIG. 9 is a schematical block diagram of the total station having the target scanning function according to another embodiment.

FIG. 9 shows another embodiment.

Figure 2:
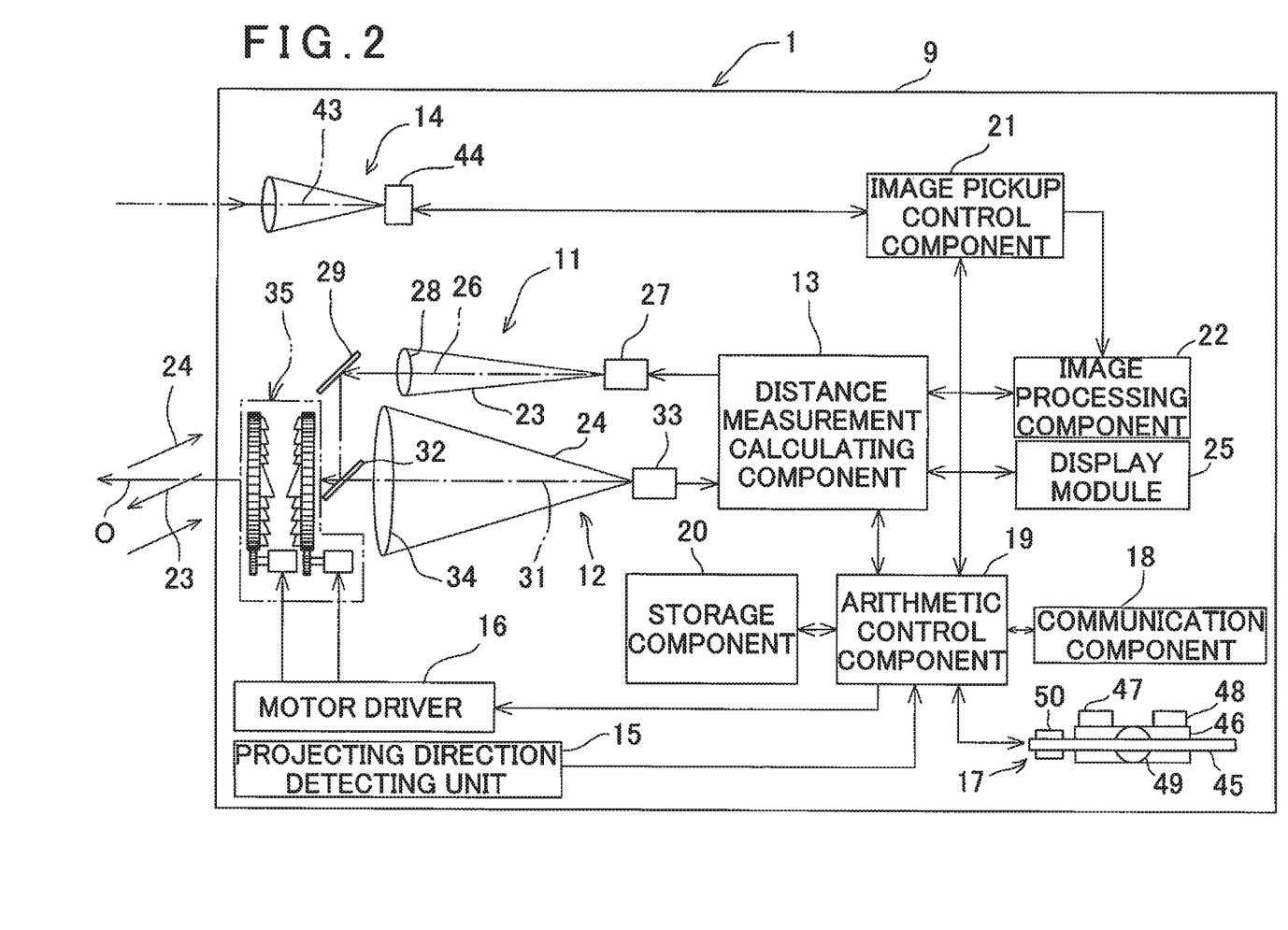
FIG. 2 is a schematical block diagram of the total station having the target scanning function.
Figure 3:
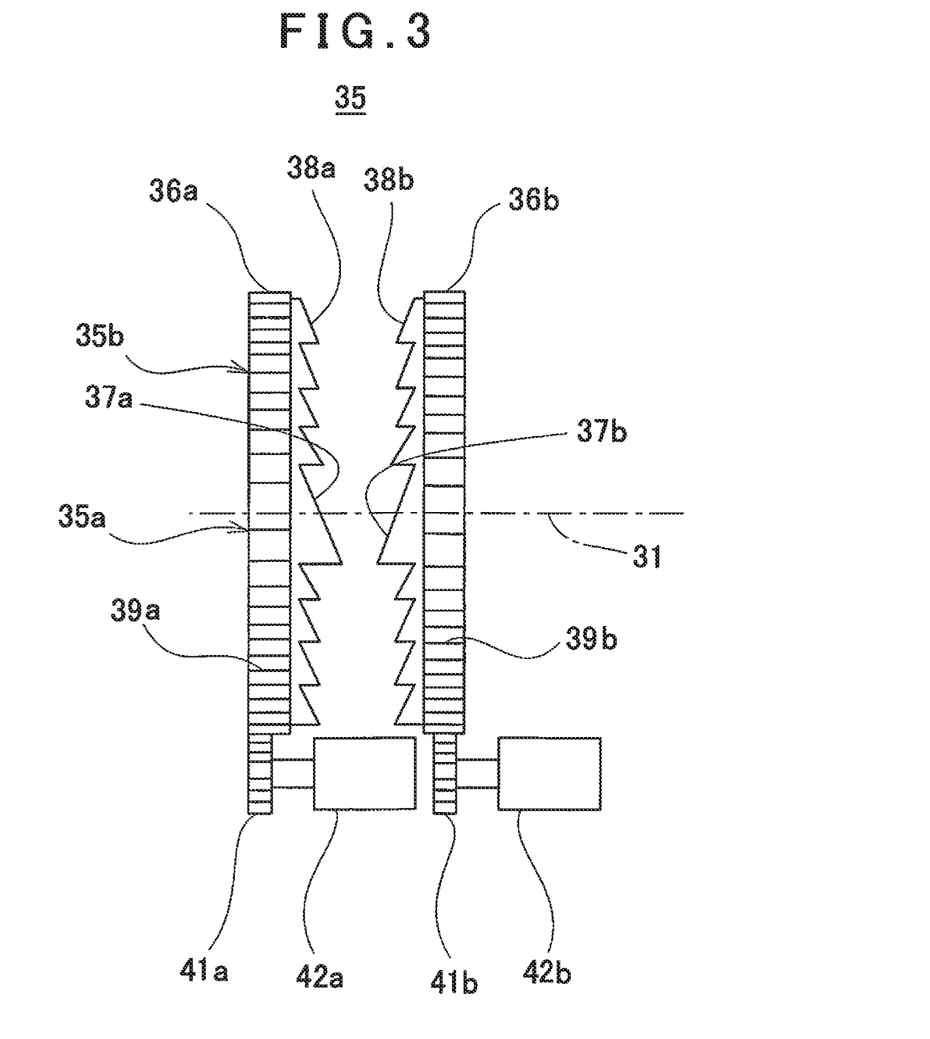
FIG. 3 is a schematical drawing of an optical axis deflecting unit in the total station.

It is to be noted that, in FIG. 9, what are equivalent to components as shown in FIG. 2 are referred by the same symbol, and a detailed description thereof will be omitted.

In another embodiment, a beam shape expanding optical component 57 is provided between a projecting lens 28 and a first reflection mirror 29. Further, the beam shape expanding optical component 57 is insertable and removable with respect to a projection optical axis 26. FIG. 9 shows a state where the beam shape expanding optical component 57 is inserted in the projection optical axis 26.

As the beam shape expanding optical component 57, a magnifying lens, a cylinder lens, a diffuser panel, an axicon lens, and the like are included.

For instance, if a magnifying lens is used as the beam shape expanding optical component 57, a distance measuring light 23 is expanded. (see FIG. 7). By expanding a beam diameter, a detection range of an object to be measured 7 in one scanning pattern 53 is widened and it becomes easy to detect the object to be measured 7.

Further, when a beam diameter is expanded and the object to be measured 7 can be detected, the beam shape expanding optical component 57 is removed from the projection optical axis 26, and a scanning is performed by the distance measuring light 23 with a small diameter according to the scanning pattern 53 and an alignment of a center of the scanning pattern 53 and a center of the object to be measured 7 (a sighting) is performed.

By expanding the beam diameter, a time for searching of the object to be measured 7 which requires a time, can be shortened, and an efficiency of a measurement can be improved.

Figure 10:
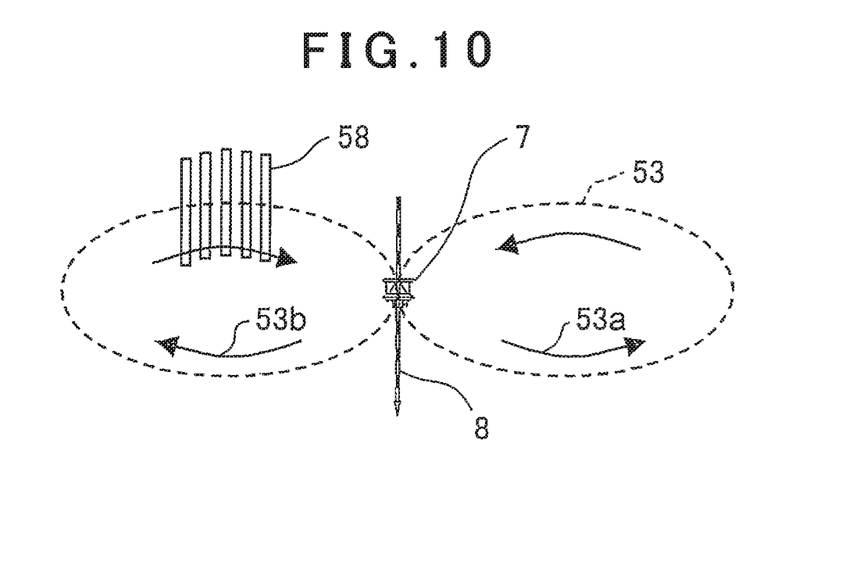
FIG. 10 is an explanatory drawing to show a relationship between the scanning pattern and a beam shape and between the scanning pattern and the object to be measured.

Next, FIG. 10 shows a modification of a case where the beam diameter is expanded. In the modification, as the beam shape expanding optical component 57, a cylinder lens is used. The cylinder lens has optical characteristics by which the distance measuring light 23 is expanded only in a vertical direction. In the modification, the distance measuring light 23 is expanded in a direction orthogonal to a scanning direction, and a beam flux section 58 has a slit shape.

When a scanning is performed according to the scanning pattern 53 in a state where the cylinder lens is inserted in the projection optical axis 26, since a luminous flux is expanded in an up and down direction, the scanning is performed with an expanded width and a searching range is expanded. Further, since the luminous flux is expanded only in the up and down direction, a reduction of a brightness caused by an expansion is small and a reduction of a light amount of a reflected distance measuring light from the object to be measured 7 is also small. Therefore, a long-distance search becomes possible.

Also in the modification, after the object to be measured 7 is detected, the beam shape expanding optical component 57 is removed and an alignment of a center of the scanning pattern 53 and a center of the object to be measured 7 is performed.

It is to be noted that a center alignment process (a center alignment) using the scanning pattern 53 and a searching process may be separated from each other.

That is, in a process of detecting the object to be measured 7, the object to be measured 7 may be extracted by an image processing from the image acquired by the image pickup unit 14, a position (that is, a horizontal angle and a vertical angle) of the object to be measured 7 may be detected, the arithmetic control component 19 may carry out the scanning pattern 53 around the horizontal angle and the vertical angle detected based on the detection result, and a center of the object to be measured 7 and a projecting point of the distance measuring light may be made to coincide with each other.

In this case, a process of detecting the object to be measured 7 from the image is equivalent to the searching process.

Further, the object to be measured 7 may be detected in such a manner that the beam diameter is expanded and the maximum searching range is scanned by a two-dimensional scanning adding to a feed (a feed amount is equal to the expanded width) in the vertical direction to a reciprocating scanning in the horizontal direction in an expanded state. In this case, a pattern of the scanning is not limited to a particular pattern, and it would suffice if the scanning can be performed in the maximum searching range such as performing the scanning in a spiral form.

Figure 11:
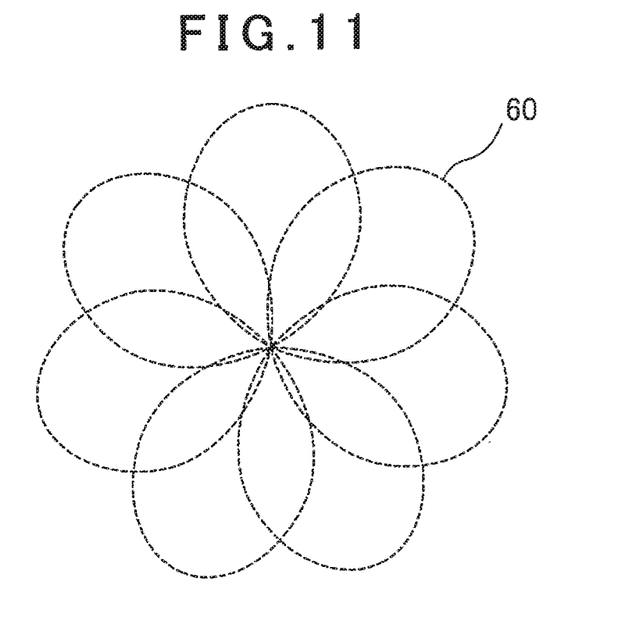
FIG. 11 is a drawing to show one example of another scanning pattern.

It is to be noted that it would suffice if the scanning pattern is a scanning pattern by which the scanning can be performed two-dimensionally and the pole 8 can be projected in the scanning range. Further, the scanning pattern is preferably a scanning pattern with an intersection point in the scanning pattern (preferably, at the center of the pattern). Further, a pattern shape is not limited to a pattern shape as described above, and an arbitrary pattern such as a shape of a figure eight, a sine curve of one cycle, or a petal-shaped pattern 60 (for instance, hypotrochoid curve) as shown in FIG. 11 can be selected.

Further, in the embodiments as described above, although an object to be measured is a prism, a reflective sheet which has equally retroreflection characteristics as a prism and reflects a reflection light with high intensity may be wound around the pole 8, and the reflective sheet may be used as the object to be measured.

Furthermore, as the beam shape expanding optical component 57, a zoom mechanism may be used, and a beam size of the luminous flux of the distance measuring light 23 may be made to be changeable.

Further, as the display module and the operation module as described above, an operation unit which can be detached and attached to the total station 1, for instance, a handheld smartphone may be used, and the display module and the operation module as described above may be remotely controlled by the operation unit.

Further, in the embodiments as described above, although the total station 1 comprises the attitude detecting unit 17 and a leveling work becomes unnecessary, instead of the attitude detecting unit 17, the total station 1 may be provided on the tripod 2 via a leveling device.

The invention claimed is:

1. A surveying instrument comprising: a distance measuring unit which includes a light emitting element for emitting a distance measuring light, a distance measuring light projecting unit for projecting said distance measuring light, a light receiving unit for receiving a reflected distance measuring light and a photodetector for receiving said reflected distance measuring light and producing a light receiving signal, and which performs a distance measurement of an object to be measured based on said light receiving signal from said photodetector, an optical axis deflecting unit provided on a distance measuring optical axis and for deflecting said distance measuring optical axis, a projecting direction detecting unit for detecting a deflection angle of said distance measuring optical axis and an arithmetic control component for controlling a deflecting action of said optical axis deflecting unit and a distance measuring action of said distance measuring unit, wherein said optical axis deflecting unit comprises a pair of optical prisms capable of rotating with said distance measuring optical axis as a center and motors which individually and independently rotate said optical prisms, and wherein said arithmetic control component is configured to control a deflection by said optical axis deflecting unit by controlling rotating directions, rotating speeds, and a rotation ratio of said pair of optical prisms, to perform a two-dimensional scanning of said distance measuring light, to perform a distance measurement of when said light receiving signal is detected during said two-dimensional scanning, to measure a horizontal angle and a vertical angle of said object to be measured based on a deflection angle detected by said projecting direction detecting unit of when said light receiving signal is detected, and to obtain three-dimensional coordinates of said object to be measured based on a distance value from said distance measuring unit, and said horizontal angle and said vertical angle.

2. The surveying instrument according to claim 1, wherein said arithmetic control component is further configured to determine a position of said object to be measured based on a light receiving intensity of said distance measuring unit.

3. The surveying instrument according to claim 2, further comprising an image pickup unit and a display module which also serves as a touch panel, wherein an image acquired by said image pickup unit is displayed on said display module, and a point as touched on said display module is set as a center of said two-dimensional scanning by said distance measuring light.

4. The surveying instrument according to claim 2, further comprising an image pickup unit, wherein said arithmetic control component is configured to detect a position of said object to be measured in an image acquired by said image pickup unit and to perform said two-dimensional scanning by said distance measuring light with the position as detected as a center.

5. The surveying instrument according to claim 1, wherein said two-dimensional scanning is a scanning according to a predetermined scanning pattern, and said scanning pattern has an intersection point at which a forward path and a return path intersect, and a distance measurement and a measurement of a horizontal angle and a vertical angle are performed at a time when horizontal angles of two light receiving signals produced by the photodetector when scanning on said forward path and said return path approximately coincide with each other and vertical angles of the two light receiving signals produced by the photodetector when scanning on said forward path and said return path approximately coincide with each other.

6. The surveying instrument according to claim 3, wherein said arithmetic control component is configured to move said scanning pattern in at least one of a horizontal direction and a vertical direction and to perform a search of said object to be measured while carrying out a scanning according to said scanning pattern.

7. The surveying instrument according to claim 6, further comprising an image pickup unit and a display module which also serves as a touch panel, wherein an image acquired by said image pickup unit is displayed on said display module, and a point as touched on said display module is set as a center of said two-dimensional scanning by said distance measuring light.

8. The surveying instrument according to claim 6, further comprising an image pickup unit, wherein said arithmetic control component is configured to detect a position of said object to be measured in an image acquired by said image pickup unit and to perform said two-dimensional scanning by said distance measuring light with the position as detected as a center.

9. The surveying instrument according to claim 5, further comprising an image pickup unit and a display module which also serves as a touch panel, wherein an image acquired by said image pickup unit is displayed on said display module, and a point as touched on said display module is set as a center of said two-dimensional scanning by said distance measuring light.

10. The surveying instrument according to claim 5, further comprising an image pickup unit, wherein said arithmetic control component is configured to detect a position of said object to be measured in an image acquired by said image pickup unit and to perform said two-dimensional scanning by said distance measuring light with the position as detected as a center.

11. The surveying instrument according to claim 1, wherein a beam shape expanding optical component is provided in said distance measuring light projecting unit, and a luminous flux section of said distance measuring light performing a scanning is expanded.

12. The surveying instrument according to claim 11, wherein said beam shape expanding optical component is a cylinder lens, and said luminous flux section of said distance measuring light is expanded only in one direction.

13. The surveying instrument according to claim 11, further comprising an image pickup unit and a display module which also serves as a touch panel, wherein an image acquired by said image pickup unit is displayed on said display module, and a point as touched on said display module is set as a center of said two-dimensional scanning by said distance measuring light.

14. The surveying instrument according to claim 11, further comprising an image pickup unit, wherein said arithmetic control component is configured to detect a position of said object to be measured in an image acquired by said image pickup unit and to perform said two-dimensional scanning by said distance measuring light with the position as detected as a center.

15. The surveying instrument according to claim 1, further comprising an attitude detecting unit capable of detecting a tilt angle and a tilting direction, wherein said arithmetic control component corrects the distance measurement, the horizontal angle, and the vertical angle based on a detection result of said attitude detecting unit.

16. The surveying instrument according to claim 1, further comprising an image pickup unit and a display module which also serves as a touch panel, wherein an image acquired by said image pickup unit is displayed on said display module, and a point as touched on said display module is set as a center of said two-dimensional scanning by said distance measuring light.

17. The surveying instrument according to claim 1, further comprising an image pickup unit, wherein said arithmetic control component is configured to detect a position of said object to be measured in an image acquired by said image pickup unit and to perform said two-dimensional scanning by said distance measuring light with the position as detected as a center.

* * * * *